C. G. LARSON.
GRAB BUCKET.
APPLICATION FILED JAN. 15, 1914.

1,136,428.

Patented Apr. 20, 1915.

WITNESSES

C. G. Larson
INVENTOR

Attorneys

UNITED STATES PATENT OFFICE.

CHARLES G. LARSON, OF BURLINGTON, IOWA, ASSIGNOR OF TWO-FIFTHS TO WM. T. LOVE, TRUSTEE, OF LOMAX, ILLINOIS.

GRAB-BUCKET.

1,136,428.  Specification of Letters Patent.  Patented Apr. 20, 1915.

Application filed January 15, 1914. Serial No. 812,241.

*To all whom it may concern:*

Be it known that I, the undersigned, CHARLES G. LARSON, a citizen of the United States, residing at Burlington, in the county of Des Moines and State of Iowa, have invented certain new and useful Improvements in Grab-Buckets; and I do hereby declare the following to be a full, clear, and exact description of the invention, such as will enable others skilled in the art to which it appertains to make and use the same.

This invention relates to grab buckets and one of the principal objects thereof is to provide a bucket for transferring water, cement or other materials.

A further object of my invention is to provide a grab bucket which will be simple, durable, efficient in operation and inexpensive to manufacture.

Figure 1:
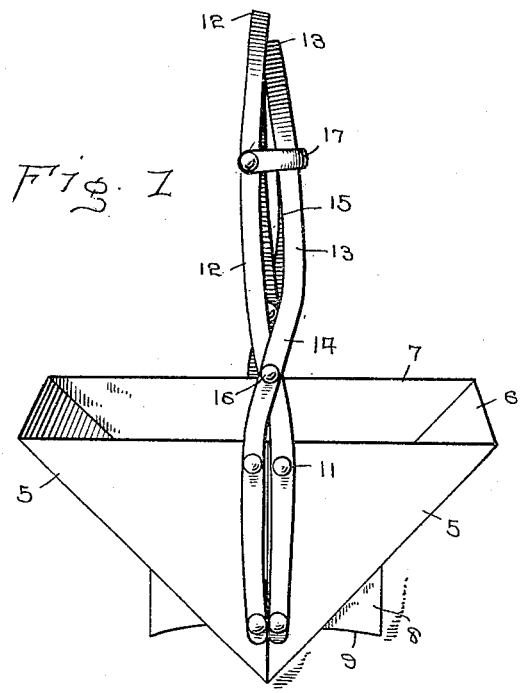
Figure 2:
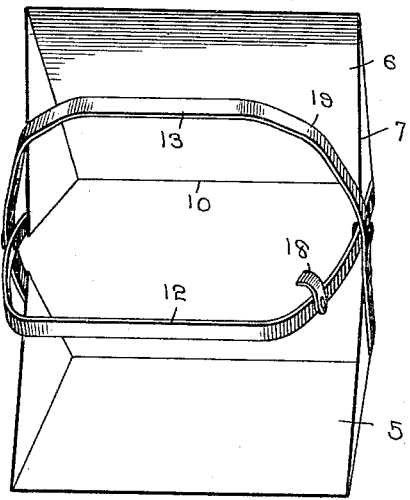

With these and other objects in view, the invention consists in the construction, combination and arrangement of parts hereinafter more fully described and claimed, and illustrated in the accompanying drawings, in which like reference characters indicate like parts throughout, and in which, Figure 1 represents a perspective view of the bucket looking from the side, and Fig. 2 represents a perspective view of the bucket in an open position and looking from the top.

The body of the bucket comprises a pair of members 5 identical in construction, and each providing a bottom 6 which is rectangular in shape and is formed at its opposite sides with upturned sides 7, said sides being in the form of an isosceles triangle. The sides and bottom of each portion of the bucket are preferably formed of a single sheet of metal. Secured in any desired manner to the bottom of the portion 6 and centrally thereof, is the triangular shaped supporting member 8 which projects at right angles to the bottom 6 and has its lower edge 9 lying in the same horizontal plane with the lower edge 10 of the bottom.

Near the inner contacting edges of each of the sides 7 is secured, by means of rivets 11, the lower ends of the arcuate bails, each of said bails being formed of a single strip of resilient material, bent to the required shape. The bail 12 is somewhat longer than the bail 13 and has its ends secured to one of the bucket members, while the bail 13 has its secured to the opposite bucket member. The central portions of the ends of the bails are oppositely bent as at 14 and crossed so as to offset the upper portions of the bails from the lower portions and to provide a space as at 15, between the upper portions of the bails. The bail 12 lies inside of the bail 13 at its central portion, and is pivoted to the bail 13 at 16. The bails are bent so as to be less in width at upper than at their lower ends, and the upper portion of the bail 13 is bent somewhat more than the bail 12 so that when the bucket is in closed position, as shown in Fig. 1, the top of the bail 13 will lie somewhat within the top of the bail 12. A keeper 17 is pivoted to the bail 12 above the pivot 16 and is in the form of a strip of metal having its free end bent inwardly as at 18, to engage the bail 13 when the bucket is in closed position, the pivot point falling opposite the point where a bend is made in the bail 13 so that when the bails are brought closely together, the keeper 17 may be swung upwardly to disengage the handle 13, the bend being great enough to allow the bent portion 18 of the keeper to clear the bail 13.

When the bucket is in closed position, as shown in Fig. 1, the lower edges 9 of the supporting members 8 coöperate with the lower edges of the bottom 6 of the bucket members for maintaining the bucket in an upright position, when the same is set down. In using the bucket, the bails are grasped by the operator and the bucket members separated as in Fig. 2, and immersed into mortar, grain or other material to be carried and are then brought together whereupon the keeper 17 may be dropped down to engage the bail 13 for retaining the bucket in closed position. In emptying the bucket, the bottom thereof may be grasped and the bucket tilted so as to allow the contents to be poured out, or the keeper may be disengaged and the bucket opened so as to allow the contents to escape downwardly from the bucket. When the bucket is in closed position, it will be noticed that the bottoms 6 are in an inclined position and are substantially at right angles to each other, and that the inner edges of the sides 7 of the bucket members meet as do also the bottom edges of the bottoms 6, so that no opening is left for the material to escape. By reason of the resiliency of the bails the bucket members are maintained in tightly closed position, while the keeper 17 is engaged with the bail 13, and the resiliency of the bails also allows the same being brought closely together for disengaging the keeper. It will also be apparent that by reason of the bail 13 being somewhat shorter than the bail 12 and falling within the same when the bucket is closed, a more comfortable grip may be maintained than would be the case were the upper edges of the bails in the same horizontal plane.

Although I have described the preferred embodiment of my invention, I reserve and may exercise the right to make such changes in the construction, combination and arrangement of parts as do not depart from the spirit of the invention and the scope of the appended claims.

Having thus fully described my invention, what I claim and desire to secure by Letters Patent of the United States is:—

1. A bucket comprising two complementary members, each having parallel, triangular end walls and upwardly and outwardly extending bottoms, the inner and upper sides of each of said members being open, whereby when said members are brought together they will form a wedge-shaped bucket, the edge thereof extending downwardly; a triangular supporting member carried by each of said complementary members, on the under side adjacent the lower edge thereof designed to support said bucket in an upright position, and an arcuate controlling bail for each of said complementary members rigidly secured adjacent the meeting side edges thereof and crossed one over the other and pivotally connected to each other where they cross at a point above the top edges of the complementary members.

2. A bucket, comprising two members of identical construction, each of said members comprising a bottom and triangular side members having contacting edges; a triangular supporting member attached to the under surface of the bottom of each of said members adjacent the lower edge of the said bottom at right angles to said edge and also to said bottom, and half way between the extremities of said edges; an arcuate bail secured to each of said bucket members along the contacting edges of the triangular side members, said bails being pivoted to each other above said bucket members and crossed at the pivoting point, whereby the bottom portions of the bucket may be made to recede from and approach each other in unison with the movements of the said bails.

In testimony whereof I have signed my name to this specification in the presence of two subscribing witnesses.

CHARLES G. LARSON.

Witnesses:
C. L. FINK,
GEORGE T. CAPPEL.

Copies of this patent may be obtained for five cents each, by addressing the "Commissioner of Patents, Washington, D. C."